United States Patent [19]

Robinson et al.

[11] Patent Number: 5,706,649

[45] Date of Patent: Jan. 13, 1998

[54] MULTI AXIS THRUST VECTORING FOR TURBO FAN ENGINES

[75] Inventors: Michael R. Robinson, Rancho Palos Verdes; Richard P. Ouellette, Torrance, both of Calif.

[73] Assignee: Boeing North American, Inc., Seal Beach, Calif.

[21] Appl. No.: 650,583

[22] Filed: May 20, 1996

Related U.S. Application Data

[63] Continuation of Ser. No. 416,115, Apr. 3, 1995, abandoned.

[51] Int. Cl.$^6$ .................................................. F02K 3/02
[52] U.S. Cl. .......................... 60/226.2; 60/230; 60/226.1; 60/229; 239/265.13; 244/110 B
[58] Field of Search .................................. 60/39.02, 228, 60/226.2, 230, 229, 226.1; 239/265.27, 265.29, 265.15, 265.13, DIG. 2; 244/110 B

[56] References Cited

U.S. PATENT DOCUMENTS

| | | | |
|---|---|---|---|
| 3,134,226 | 5/1964 | Gardiner et al. | 60/229 |
| 3,483,702 | 12/1969 | Ward | 60/226.2 |
| 3,603,090 | 9/1971 | Billinger | 60/226.2 |
| 3,736,750 | 6/1973 | Britt | 60/226.2 |
| 3,739,582 | 6/1973 | Maison | 60/226.2 |
| 3,779,010 | 12/1973 | Charnay et al. | 60/226.2 |
| 3,815,357 | 6/1974 | Brennan | 60/226.2 |
| 3,820,719 | 6/1974 | Clark | 60/226.2 |
| 3,829,020 | 8/1974 | Stearns | 239/265.13 |
| 4,030,291 | 6/1977 | Sargisson | 60/226.2 |

Primary Examiner—Timothy Thorpe
Assistant Examiner—Ted Kim
Attorney, Agent, or Firm—Lawrence N. Ginsberg; Charles T. Silberberg; Terrell P. Lewis

[57] ABSTRACT

The present invention is a thrust reversing apparatus for diverting purely rearwardly directed air flowing through an engine nacelle to combined rearward-and-radially-outward flow, and then to a combination of various radially outward angles and forward flow, where in the latter states thrust reversal is effected. The apparatus includes parallel inner and outer air flow blocking members driven by actuators which are coupled to the blocking members for effecting synchronous movement. The inner member includes a first door having fixed vanes and a solid second door pivotably coupled to the first door. The inner member has a closed position in which the two doors are collinear, and various open positions in which the two doors are pivoted relative to one another. The outer member comprises an array of pivotable, parallel vanes, and has a closed position in which the vanes tightly overlap, and various open positions in which the vanes are pivoted out of contact with each other through various amounts of rotation.

9 Claims, 9 Drawing Sheets

| CONDITION | DEMAND | ACTIVE SECTIONS | INTERNAL RAMP | VANES |
|---|---|---|---|---|
| PITCH UP | NOMINAL<br>LOW<br>MEDIUM<br>MAXIMUM<br>TR | 4 & 5<br>3,4,5,6<br>"<br>" | 0°<br>MINIMUM<br>MODERATE<br>MAXIMUM<br>" | OPEN<br>~10°<br>~45°<br>~90°<br>~120° |
| YAW LEFT | NOMINAL<br>LOW<br>MEDIUM<br>MAXIMUM<br>TR | 6 & 7<br>5,6,7,8<br>"<br>" | 0°<br>MINIMUM<br>MODERATE<br>MAXIMUM<br>" | OPEN<br>~10°<br>~45°<br>~90°<br>~120° |
| SPOIL | NOMINAL<br>LOW<br>MEDIUM<br>MAXIMUM<br>TR | 1→8<br>"<br>"<br>"<br>" | 0°<br>MINIMUM<br>MODERATE<br>MAXIMUM<br>" | OPEN<br>~10°<br>~45°<br>~90°<br>~120° |

MULTI AXIS THRUST VECTORING FOR TURBO FAN ENGINES

This application is a continuation of application Ser. No. 08/416,115 filed on Apr. 3, 1995 now abandoned.

BACKGROUND OF THE INVENTION

1. Field of the Invention

The present invention relates to mechanisms for altering the thrust produced by turbo-fan engines, and more particularly to multi-axis thrust vectoring devices incorporated into the nacelle of an aircraft for augmenting control of the craft while reducing overall weight, lowering fuel burn, reducing maintenance and improving safety.

2. Description of the Related Art

Mechanisms for accomplishing engine thrust reversal have been known for some time. Various designs have been implemented, including cascade vanes, deployable doors to turn air flow, and blocker doors to divert air flow.

These thrust reversing devices have never demonstrated as high a degree of efficiency payoff as multi-axis thrust vectoring systems, when used on fighter, attack, or experimental aircraft.

Commercial and military transport aircraft would most likely also benefit from the use of multi-axis thrust vectoring systems. Near-term retrofit programs for transport class aircraft would improve aircraft control, increase range by lowering drag, and save weight. These benefits would translate into reduced life cycle costs of ownership through lower fuel burn, reduced maintenance and improved safety.

In addition, the advent of modern, fast-acting control systems has encouraged studies of full integration of thrust vectoring techniques into aircraft flight control systems.

Application of thrust vectoring principles on future aircraft could yield even greater benefits. A fully integrated thrust vectoring flight control system will enable designers to eliminate or significantly reduce the conventional horizontal and/or vertical control surfaces now used to control conventional aircraft. This will translate into substantial weight and cost savings due to reduction of the number of produced components and their respective controls, as well as lower drag levels.

OBJECTS AND SUMMARY OF THE INVENTION

It is, therefore, a principal object of the present invention to provide a novel thrust vectoring apparatus for controlling flight of the aircraft while overcoming all the disadvantages and drawbacks of currently known similar thrust vectoring mechanisms.

Another object of the present invention is to provide a multi-axis thrust vectoring apparatus which is incorporated into an aircraft's engine nacelle for controlling the direction of thrust generated by the engines so that flight behavior of the entire aircraft can be altered by appropriate manipulations of the thrust vector apparatus.

It is a further object of the present invention to provide engine-mounted multi-axis thrust vectoring apparatus for controlling engine-generated thrust while achieving reduction in overall weight, lower fuel burn, reduction of maintenance, improved safety and producibility.

These and other objects and advantages are achieved by the present invention in which thrust reversing apparatus is provided for diverting air flowing through an engine nacelle from pure rearward flow to a combination of rearward and radially outward flow, and then to a combination of various radially outward angles and forward flow, where in the latter state thrust reversal is effected. The apparatus comprises inner and outer air flow blocking members disposed parallel to one another in the nacelle housing and driven by actuators coupled to the two blocking members for effecting their synchronous movement. The inner blocking member, which includes a first door having fixed vanes and a solid second door pivotably coupled to the first door, has a closed position in which the two doors are collinear and various open positions in which the two doors are pivoted relative to one another out of the collinear relationship. The outer blocking member, which comprises an array of pivotable, parallel vanes, has a closed position in which the vanes overlap and are tightly secured against one another and various open positions in which the vanes are continuously pivotable out of contact with one another through various amounts of rotation from a first position in which the air flow is directed predominantly rearwardly to any one of several progressively more open positions. For example, the vanes may be rotated to a second position is which the air flow is directed rearwardly and radially outwardly, then to a third position in which the air flow is directed predominantly radially outwardly, then to a fourth position in which the air flow is directed radially outwardly and forwardly, and then to still another position in which the air flow is directed predominantly forwardly. When the thrust reversing apparatus is actuated, and then the outer and inner blocking members move in synchronicity with each other as described above to achieve one or more of the thrust diverting positions effected by the combined movement of the two air flow blocking members together.

BRIEF DESCRIPTION OF THE DRAWINGS

FIG. 7 is a table showing the conditions which are necessary to achieve desired aircraft responses using the thrust vectoring assemblies of the present invention;

Similar elements or parts in the various figures of the drawings are designated by the same or similar reference characters.

DETAILED DESCRIPTION OF THE PREFERRED EMBODIMENTS

Figure 1:
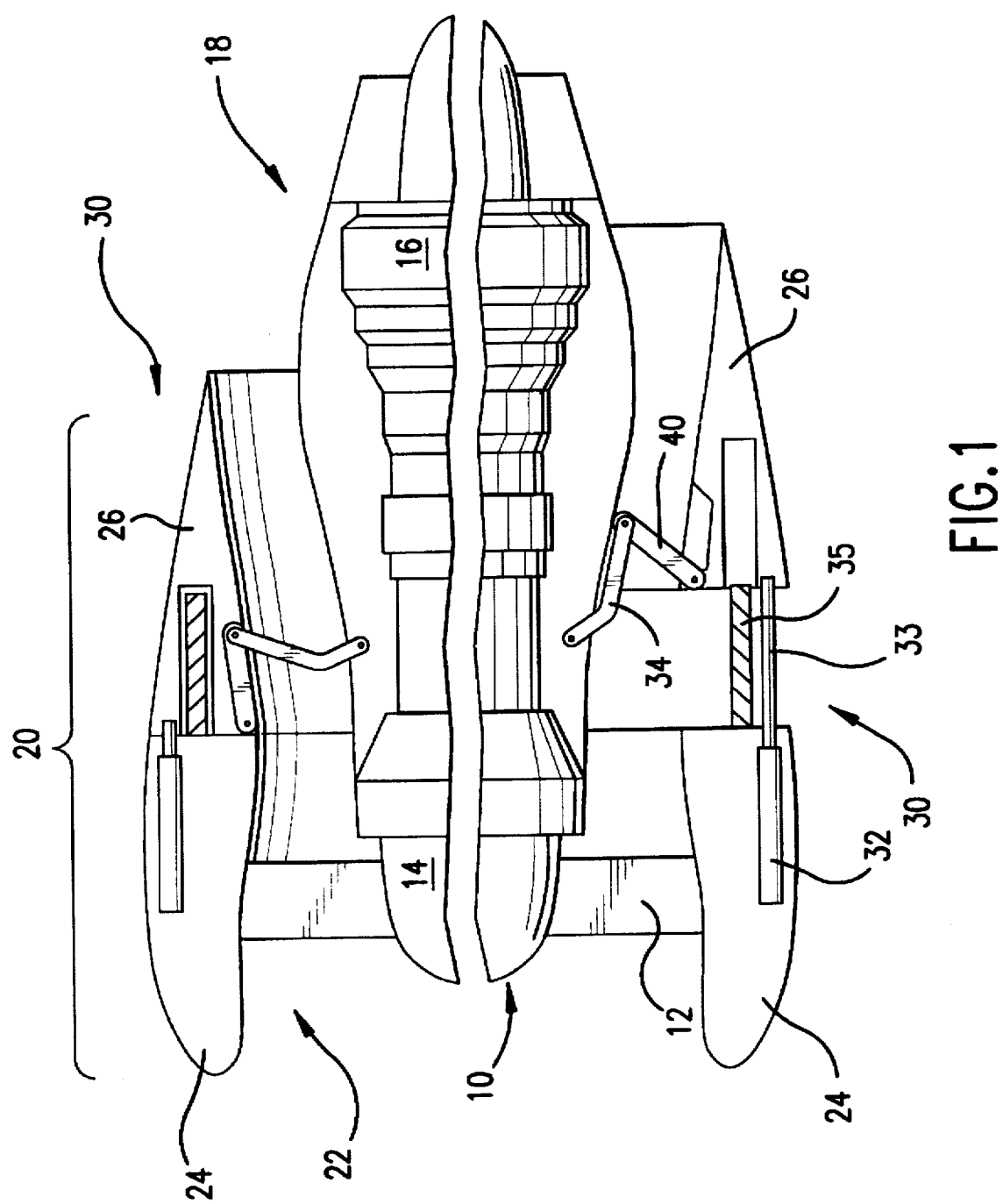
FIG. 1 is a cross-sectional schematic view of a typical flow bypass turbo-fan engine showing a typical thrust reverser apparatus in an inoperative position (the upper portion of the Figure) and in an operative position (the lower portion of the Figure)

FIG. 1 of the drawing illustrates one example of an engine thrust reverser mechanism well-known in the art. The engine shown in FIG. 1 is a turbo-fan engine, and it will be noted that the top portion of the drawing shows the thrust reverser mechanism in a closed, inoperative, position, while the bottom portion of the drawing shows the thrust reverser mechanism in an open, operative, position. The elements shown in the top and bottom drawing portions are the same; however, they are depicted as being positioned in different locations or orientations as a result of the state of operativeness of the thrust reverser mechanism.

As shown in FIG. 1, the engine 10 includes a fan 12, a compressor 14, and a turbine 16. The fan is at the inlet 22 of the engine, the compressor is located in the forward region of the engine, and the turbine is located at the exhaust region 18 of the engine. Fan casing 20, which surrounds the fan of the engine, includes the inlet 22, a fixed cowl 24, a movable cowl 26, and a thrust reversing assembly 30.

The thrust reversing assembly 30, shown in greater detail in FIG. 2, includes a piston cylinder 32, a piston rod 33, linkage 34, thrust reversing element 35 (to be described in greater detail below) and an internal cavity 36 in the movable cowl 26 for housing and preventing operation of the thrust reversing element when the fixed and movable cowls 24, 26 are disposed in the inoperative position seen in the upper portion of the engine in FIG. 1.

The lower portion of FIG. 1 shows the fixed cowl 24 and the movable cowl 26 disposed in a second position. The piston cylinder 32 is secured to the fixed cowl member 24, and one end of the piston rod 33 is carried by the piston cylinder 32 while the other end of piston rod 33 is secured to the movable cowl member 26. The thrust reversing element 35, attached between the fixed cowl 24 and the movable cowl 26, becomes fully exposed when the cowls are caused to separate by extension of the piston rod 33 relative to the piston 32.

An air blocking door 40 has one end pivotally attached to the movable cowl 26 and its opposite end pivotally attached to the linkage 34. Linkage 34 is pivotally attached between the door 40 and the engine compressor fairing at 42.

When the cowls 24 and 26 have separated, the air being sucked into the engine inlet 22 via fan 12 is blocked by the door 40 which has been pivoted into an air blocking position by pivoting motion of the linkage 34. The air is then forced to escape from the now-blocked air flow path through the opening created between the separated cowls 24 and 26.

In passing through this "exit", the air flow engages forwardly directed vanes 60 fixed in position relative to one another and located on the thrust reversing element 35. The air then changes its direction from being rearwardly directed to being substantially forwardly directed. In this way, the thrust reversing element effects thrust reversal.

Travel of door 40 to the operative position (shown in the lower portion of FIG. 1 as well as in FIG. 2) is effected by actuation of the piston rod 33 rearwardly to move the cowl 26 rearwardly and expose the thrust reversing element 35. At the same time, the linkage 34 pivots rearwardly about its connection 42 to the engine compressor fairing, pulling the blocker door 40 away from the cowl 26 toward the engine compressor fairing so that the blocker door effectively blocks the path of air flowing through the engine airpath 50. At this time, the air now entering the engine through inlet 22 is forced to change direction and exit the airpath upstream of the cowl 26 at the thrust reversing member 35 now exposed between the cowls 24 and 26. The air is caused to exit the airpath 50 with a forwardly directed component F due to the angular orientation of the openings in the thrust reversing member 35.

Figure 3:
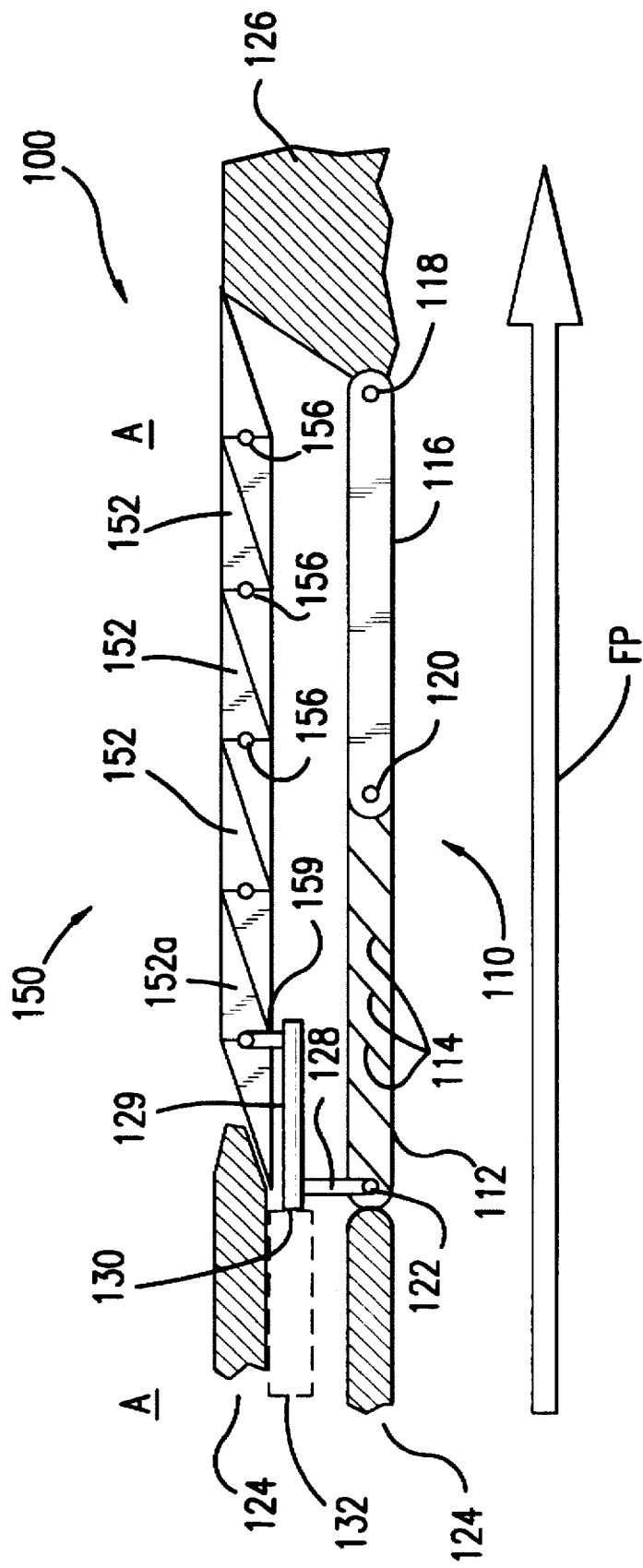
FIG. 3 is a schematic diagram showing a first embodiment of the thrust vectoring apparatus of the present invention in an inoperative position.
Figure 4:
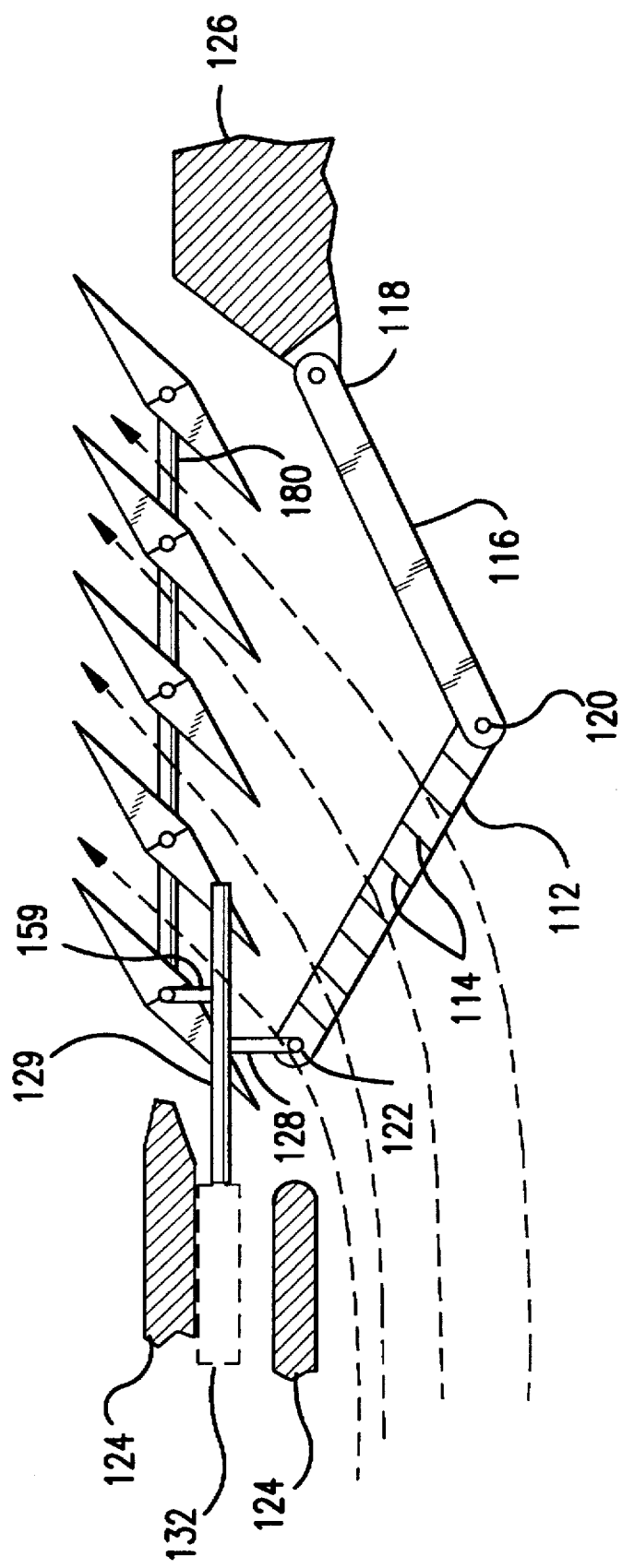
FIG. 4 is a schematic view of the thrust vectoring apparatus of FIG. 3 in a first operative position in which thrust is both vectored and diminished.
Figure 5:
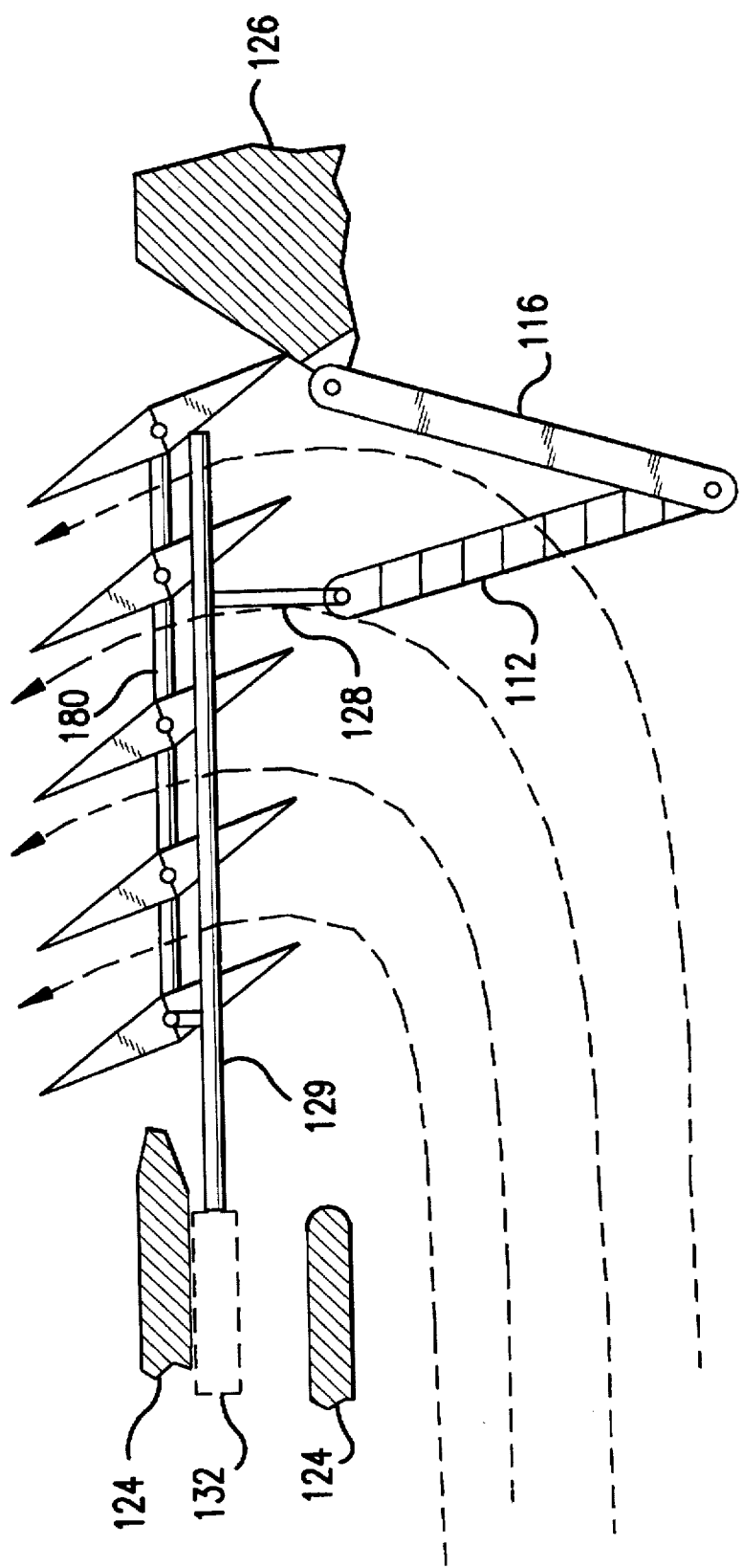
FIG. 5 is a schematic view of the thrust vectoring apparatus of FIG. 3 in a second operative position in which thrust is both vectored and reversed.

FIGS. 3-5 show a first embodiment of the thrust vectoring assembly 100 embraced by the present invention. The present invention contemplates integrally incorporating one or more of the thrust vectoring assemblies into an engine nacelle, with the thrust vectoring assemblies being arranged circumferentially about the engine turbine and compressor sections at the rearward region of the engine nacelle. The present invention further contemplates the placement of such thrust vectoring mechanisms in each engine nacelle of the aircraft, with these thrust vectoring mechanisms operating in conjunction with each other to effect aircraft attitude, pitch and yaw control.

Referring first to FIG. 3, each thrust vectoring assembly 100 is disposed between the forward and rearward cowl sections 124 and 126. These sections correspond to the fixed and movable cowl sections 24 and 26 of the thrust reversing mechanism 30 of the prior art (shown in FIGS. 1 and 2), but in the present invention are physically related and integrated as a single, structural assembly.

Unlike cowl sections 24 and 26, which are moved between closed and open positions to cover and expose the thrust reverser member 35, cowl sections 124 and 126 are designed to be separated at the outset, with attainment of thrust vectoring being controlled by actuation of the elements one or more of the thrust vectoring assemblies.

The thrust vectoring assembly 100 of the invention includes two members which together alter the air flowing through the engine: a first, inner, airflow blocking member 110 and a second, outer, airflow direction altering member 150 arranged substantially parallel to the first member. Both the first and second members are disposed in and extend across the separation between the forward cowl section 124 and the rearward cowl section 126. The second member 159 includes pivotable vanes or louvers 152, the endmost of which have edge portions that engage against adjacent edges of the cowl sections such that the edge portions effectively act as seals for effectively preventing fluid flow between the ambient air A and the engine flow path air FP (shown in FIG. 3 by the arrow) when the first and second members are in an inoperative position, as shown in FIG. 3.

The first and second members function together to alter the direction of air flowing through and about the engine fairing between a first state (illustrated in FIG. 3) in which the flow is solely along and about the engine fairing, a second state (illustrated in FIG. 4) in which the flow is partially deflected radially outwardly of the engine by a slight intrusion of the first member into the engine air flow path and a slight rotation of the pivotable vanes 152 of the second member (counter clockwise) toward the outside of the engine nacelle, and a third state (illustrated in FIG. 5) in which the flow is substantially entirely diverted from the engine flow path and directed radially outwardly and forwardly of the engine (see discussion bellow for more details), thereby producing a forwardly-directed, craft reversing, force.

The first member 110 comprises a first segment 112 bearing a plurality of vanes 114 oriented at about 45 degrees to the longitudinal axis of the engine (generally parallel to the flowpath FP), and a second, solid segment 116 having a length which is substantially equal to the length of the first segment.

The rearward end of the second segment is supported on the rearward cowl section 126 at a pivot 118. The forward end of the second segment is connected via pivot 120 to the rearward end of the first segment 112. The pivot 120 is constructed so as to only permit inward movement of the pivot 120 toward the engine fairing, as shown in FIGS. 4 and 5. The forward end of the first segment is connected via pivot 122 to a linkage 128 which, in turn, is rigidly connected to the piston rod 129 at connection point 130.

The piston rod 129 is connected to a piston 132 disposed within the forward cowl section 124 adjacent the rearward portion thereof. The operation of the piston rod 129 will be described in more detail below.

The second member 150 includes a set of pivotable louvers 152, which are connected together via appropriate linkage so as to be pivoted simultaneously about pivots 156. In the preferred embodiment shown in FIGS. 3–5, all of the louvers 152 pivot with the same degree of rotation.

A linkage 159 has one end connected to the set of louvers, preferably to the forwardmost louver 152a at a connection point 160, and the other end connected to a second actuator (not shown) which travels in tandem with (adjacent and next to) the rod 129, but through a distance proportionate with the distance travelled by the rod 129, so that the first and second members are each piston driven by their respective piston rods between first, second, and third, positions.

Figure 3A:
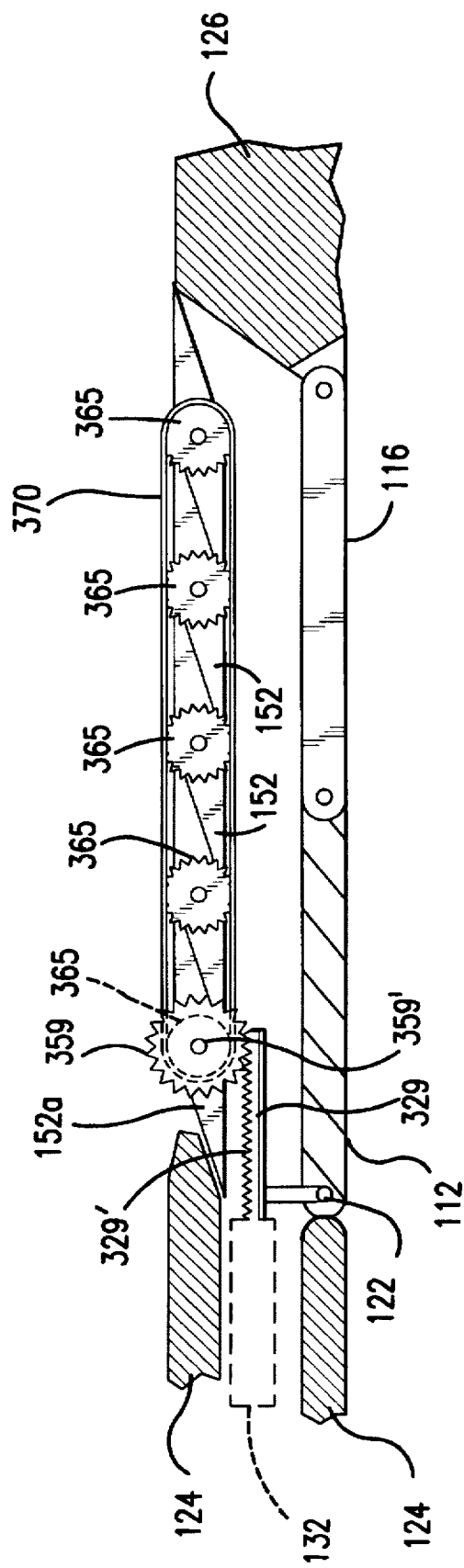
FIG. 3a shows a variation of an actuator shown in FIG. 3.

An alternative embodiment of the louver driving means is shown in FIG. 3a to include a piston rod 329 having gear teeth 329' extending along the length thereof, and a wheel gear 359 (which replaces the linkage 159) coupled to the louvers (at 152a) to drive the latter in rotation about their pivot axes 360. Each of the louvers have a gear 365 located at their pivot axes which has a diameter smaller than the diameter of the gear 359. A "timing" chain or belt 370 engages and is driven by reduction gear 359' on the rear of gear 359. The teeth of gears 365 engage teeth on the belt or notches in the chain. Linear motion of the piston rod 329 is thus converted to a desired rotational movement of the gears 359, 360 and hence rotation of the louvers.

In a manner similar to that shown in connection with the preferred embodiment, the forward end of the first segment 112 of the member 110 is connected via pivot 122 to linkage 128 which, in turn, is rigidly connected to the piston rod 329 at connection point 130.

The first position (see FIG. 3) is an inoperative position, where the piston 132 has not been actuated so that the piston rod 130 is held in its retracted position. The facing sides of adjacent louvers 152 are thus held in contact with one another so that the louvers are maintained substantially parallel to one another, and to the longitudinal axis of the engine, to effect a closed wall between the forward cowl section 124 and the rearward cowl section 126.

The second position, shown in FIG. 4, is a position in which the set of louvers become partially operative to divert air, flowing through the engine flow path, in such a manner as to effect thrust reduction.

In this second position, the louvers 152 are rotated about pivots 156 so that the forward portions of the louvers are positioned radially inwardly toward the longitudinal axis of the engine, while the rearward portions of the louvers are rotated outwardly of the engine longitudinal axis. It is to be noted, however, that throughout their rotation, all the louvers maintain their parallel relationship to one another.

The third position, shown in FIG. 5, is a position in which the louvers become fully operative to divert engine thrust forwardly. In this position, the louvers have been further rotated (counter clockwise) about their pivots 156 such that the once rearwardly directed portions of the louvers are now directed forwardly. At the same time, the solid segment 116 of the member 110, located immediately radially inwardly of the set of vanes, is caused to fold inwardly toward the turbine section of the engine. In the inwardly folded position, the solid segment 116 blocks rearward flow of engine air and forces the flow to turn and flow in a forwardly oriented direction.

The embodiment of the present invention shown in FIGS. 3–5 combines the forward cowl and the fan reverser into one single, movable, structural component. This not only enhances the structural integrity of the nacelle, but also provides integration of the air flow blocking segments and their linkages into a fixed fan cowl assembly, thus enabling a reduction in weight as well as increased reliability and maintainability.

Figure 2:
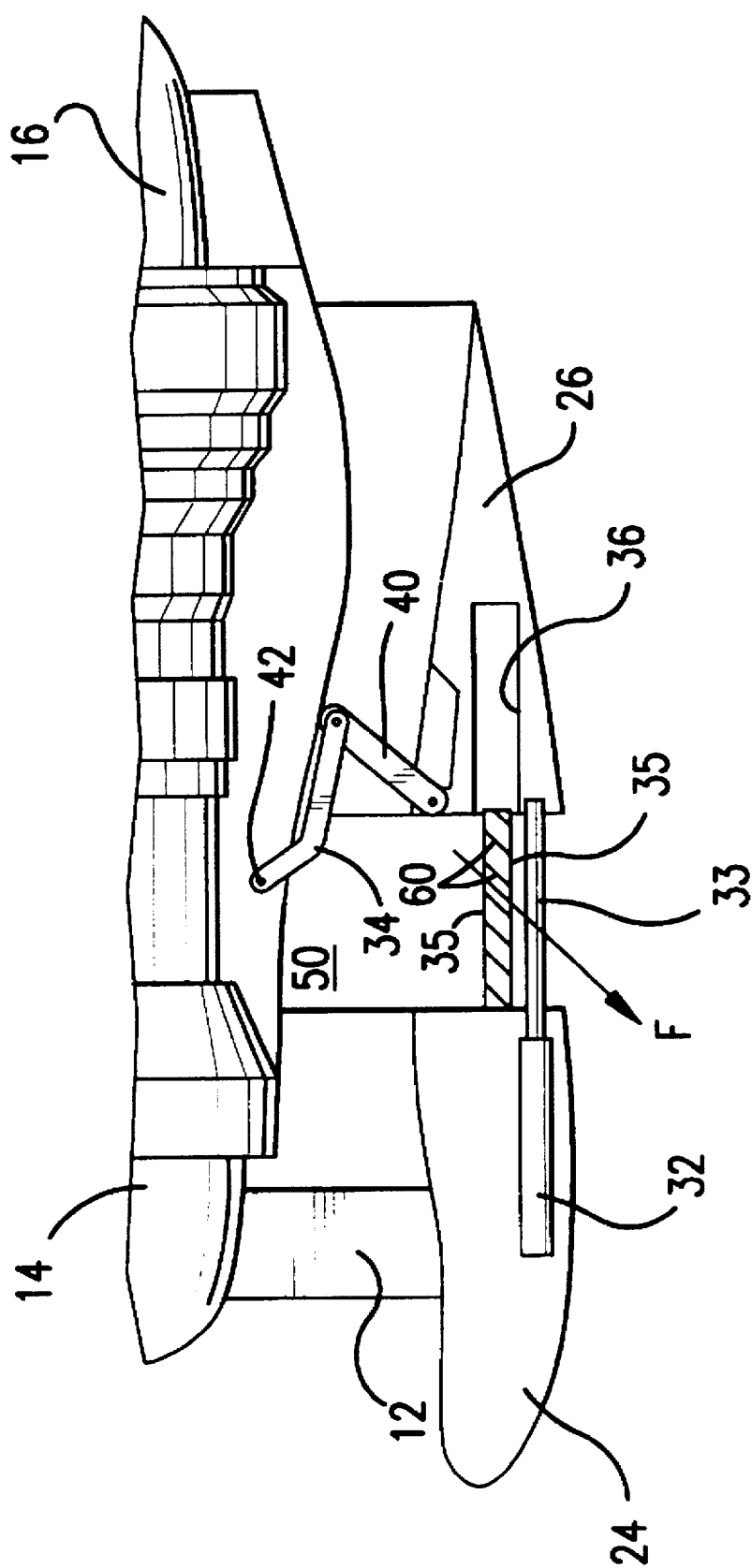
FIG. 2 is an enlarged view of the thrust reversing assembly 30 shown in FIG. 1 in a partially operative position.

Comparing the structure of FIGS. 1 and 2 (the prior art) and the structure of FIGS. 3–5 (the first embodiment of thrust reversers in accordance with the teachings of the present invention), it can be seen that an essential modification has been made in the structure of the fan reverser assembly. The conventional, fixed, thrust turning vanes have been replaced by a series of variable pitch turning vanes.

In the position of FIG. 3, the outer surfaces of the vanes serve as the outer nacelle mold line. The direction of fan flow within the engine that passes by the reverser assembly is influenced by a hinged, dual section, diverter door. The diverter door is the functional equivalent of the door and hinge assembly shown in FIG. 1, and is composed of a forward cascade assembly including vanes 114, and a solid, non-porous, panel 116 aft of the hinge 120.

In the thrust vectoring arrangement shown in FIG. 3, fan flow first passes between the engine fairing and the cascade vane set 114, then between the engine fairing and the solid panel 116, and finally the flow exits the rear end of the nacelle in the conventional manner. The tight side-to-side sealing abutment of adjacent louvers of the outer member 150 and the edge portion seals of the endmost vanes 152 prevent appreciable leakage through the vane set 114, as well as the hinge and sides of the first member 110, when the latter is stowed in the inoperative position shown in FIG. 3.

Referring now to FIG. 4, during the onset of thrust vectoring, the piston rod 129 is moved rearwardly a predetermined amount causing the forward end of the inner member 110 to translate rearwardly, while at the same time, the actuator connected to the first vane 152a also moves rearwardly. Such movement of these actuators (1) causes the vanes 152 of the outer member to rotate about the pivots 156 so that the rearward ends of the vanes move outwardly (in a counter clockwise motion as viewed in FIG. 4), and (2) causes the second, inner member 110 to fold inwardly about the hinge 120 so that the door 116 partially blocks the flow of air in the engine core exhaust path (represented by the arrow FP), and forces the air through the partially open vane set of the outer member 150. It should be noted, however, that at the instant rotation of the louvers of the outer member is initiated, the inner member has not even started its inward movement. It is at the onset of opening the outer member louvers, at the beginning of their movement toward a partially operative position, that pressure in the engine flow path is at first merely relieved. Thereafter, the pressure of the air flowing in the engine flow path is diminished as the louvers open further, by redirection of the air flow in the direction of the ambient through the outer member louvers. At this time, the pressure in the engine causes the engine air to flow through the vanes 114 of the first segment 112 of the inner member to the thrust vectoring louvers or vanes of the outer member without pivoting, opening movement of the inner member. This initial relative position of the inner and outer members is defined as a "minimum thrust vectoring position".

As thrust vectoring demands increase, the vanes of the outer member continue to be urged in rotation in a radially outwardly directed (counter-clockwise direction) manner by the continued rearward translation of the piston rod 130. The forward end of the inner member 110 begins to translate in a rearward direction, and the vane set and blocker door of the inner member begin to fold about the hinge 120 inwardly into the engine fan flow path FP. Increased aft translation of the inner member is a function of the thrust vectoring demand (more demand results in more movement). As the inner member folds, the engine fan flow is channeled through the vane set, and in conjunction with the solid blocker door 116, causes the flow to exit out the louvers of the outer member. The solid panel 116 serves as a guide for directing the engine air flow to the louvers of the outer member, as well as providing a smooth transition surface for the undiverted flow in the flow path FP to minimize thrust coefficient losses during vectoring.

When full thrust vectoring is needed or desired, the actuators for each of the inner and outer members translate from the partially operative position (shown in FIG. 4) to their rearwardmost position, causing the inner member to be substantially completely folded relative to the vaned member 112 such that the vaned member and the door member 116 delimit a "V" therebetween, and further causing the leading ends of the louvers of the outer member 110 to rotate further about their pivots 156 from the partially operative position shown in FIG. 4 to more forwardly directed positions. The leading ends of the outer member louvers move through an angle of approximately 120° from the closed, inoperative position shown in FIG. 1.

The present invention contemplates placing each set of inner and outer thrust vectoring members 110 and 150 at several, equally spaced, locations about the circumference of each engine nacelle.

The invention further contemplates actuating pairs or sets of thrust vectoring members in each thrust vectoring assembly located at each engine nacelle to effect thrust vectoring of the entire aircraft, or actuating the thrust vectoring assemblies located at, or associated with, more than one engine nacelle at a time, to effect thrust vectoring of the entire aircraft.

Figure 6:
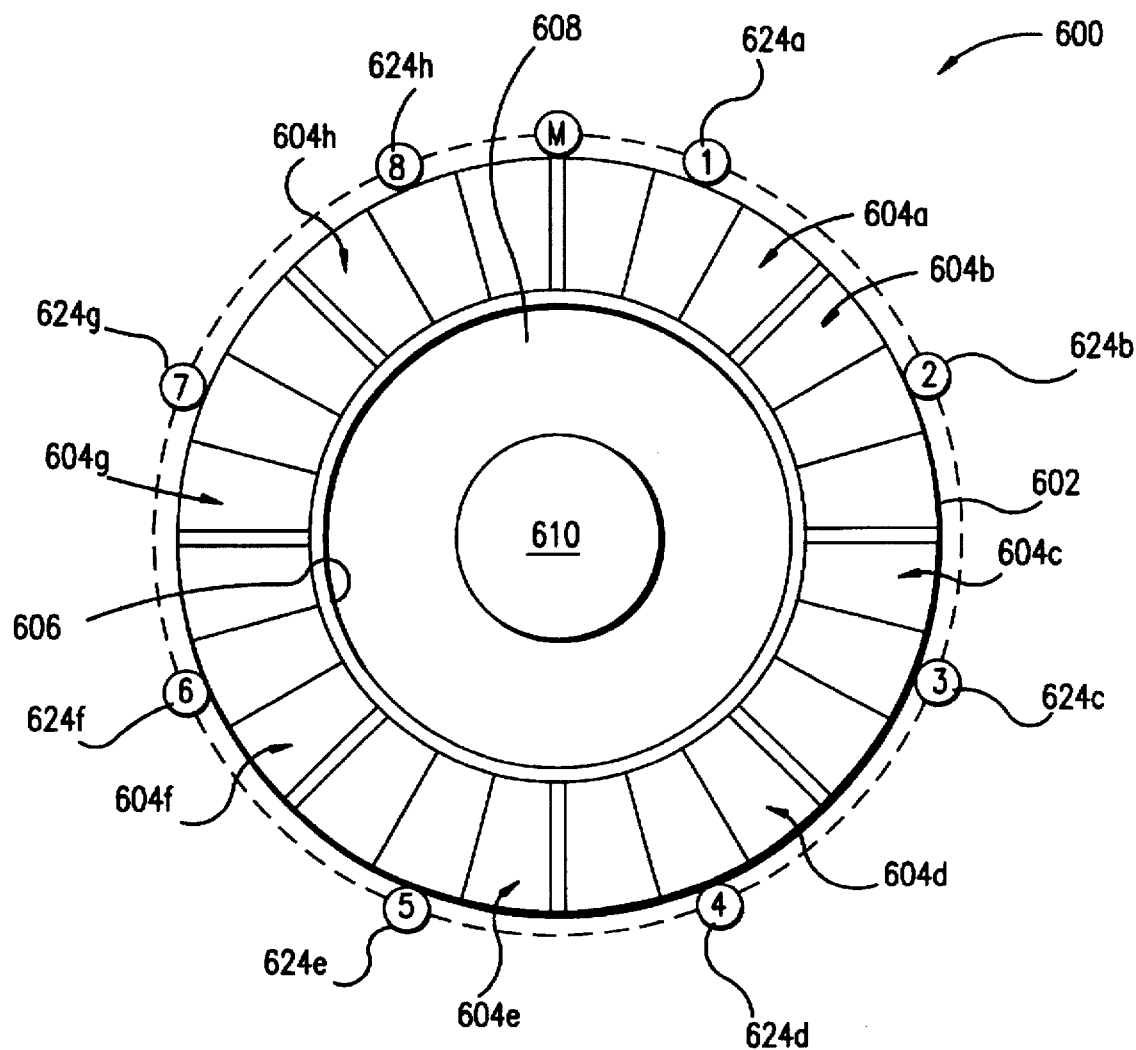
FIG. 6 is a schematic rear view of an engine nacelle with one exemplary arrangement of actuators and thrust vectoring assemblies about the circumference of the nacelle to effect thrust vectoring, as contemplated by the present invention.

Referring now to the schematic representation of FIG. 6, there is shown an engine nacelle 600 viewed from the rear looking forwardly, with a circumferentially arranged set of actuators and deployable thrust vectoring assemblies. As shown, the engine nacelle includes a outer cowl 602, a plurality of circumferentially adjacent, deployable thrust vectoring vane assemblies 604a, 604b, 604c, 604d, 604e, 604f, 604g, 604h, an outer engine fairing 606, a core engine exhaust duct 608 which defines the engine flow path FP, and an inner engine fairing 610.

Each of the thrust vectoring vane assemblies includes a plurality of individual louvers arranged in the manner shown in FIGS. 3-5. For ease of illustration, FIG. 6 shows each louver set to number three (3); however, the invention contemplates using any number of louvers in a set.

Most multi-axis thrust vectoring applications will need to use eight thrust vectoring assemblies or "sections", each including of three adjacent TV vane sets. With conventional nacelle geometry, vane sets having three sections are driven together in unison with each using one actuator 624a, 624b, 624c, . . . 624g or 624h. For an example, the louvers in vane set 604a are driven by actuator 624a of the first section, while the louvers in vane set 604c are driven by actuator 624c of the third section. Operable driving actuators of the various sections are said to be "active".

In other applications, a connecting sleeve could be integrated into the geometry of the outer cowl, and two master actuators would be provided to drive eight slave actuators with digital clutching means to vary thrust vectoring and thrust reversing levels.

Figure 9:
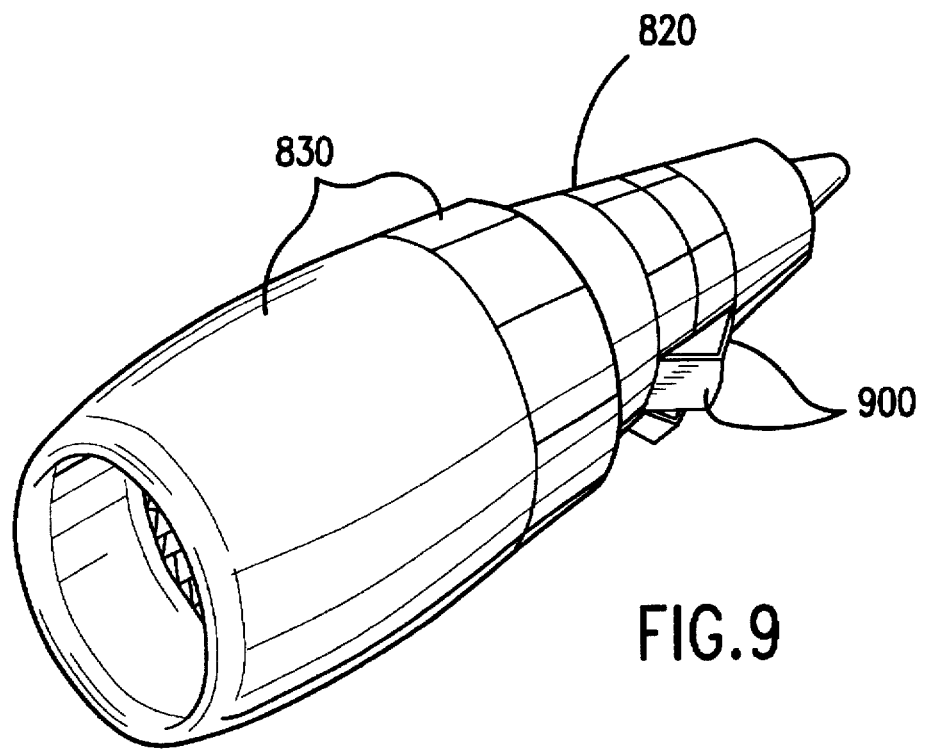
FIG. 9 is a perspective view of the thrust vectoring assembly shown in FIG. 8.

The table in FIG. 9 shows how various groups of actuators might be activated to achieve total aircraft control for three different conditions. For each condition, the louvers in a set can be pivoted through various amounts of angular motion (see discussion regarding FIGS. 3-5) to achieve various degrees of thrust control. An "active" section is a set of vanes driven by an activated actuator.

For example, the first condition "Pitch up" results in the imposition of an upwardly directed force on the forward thrust component of the aircraft. To meet a nominal demand for upward pitching, actuation of thrust vectoring assemblies 604d and 604e is initiated, while at the same time, the inner airflow blocking member 110 is maintained in a closed position (as shown in FIG. 3). To meet a low level of demand for upward pitching, four thrust vectoring assemblies 604c, 604d, 604e, and 604f are actuated such that the inner airflow blocking member is opened a slight bit, and the louvers open about 10°. To meet a medium demand for upward pitching, the same four thrust vectoring assemblies 604c, 604d, 604e, and 604f are actuated in such a manner that inner airflow blocking member is opened a moderate amount, and the louvers are opened about 45°. To meet a high or maximum demand for upward pitching, thrust vectoring assemblies 604c, 604d, 604e, and 604f are actuated such that the inner airflow blocking member is opened a maximum amount, and the louvers are opened about 90°.

For the other identified conditions, similar operation of the thrust vectoring assemblies is contemplated by the invention. "Yaw left" is a condition in which a force having direction towards the left is imposed on the forward thrust component of the aircraft. The "Spoil" condition occurs when it is desired to keep the engine revved up, but to diminish or eliminate the forward thrust component. This condition typically is encountered or used when aircraft are approaching an aircraft carrier and are about to land (or not land) on the carrier's deck. The engine must be running at full power, but the forward thrust component of the engine must be eliminated so that the aircraft can either alight on the carrier deck (then the engine is shut down), or if such landing is thwarted, the forward thrust component is reinstated and the aircraft can immediately take off. In this condition, all flow of air directed to the rear through the engine must be blocked, and the flow must be directed radially outwardly instead.

The "Spoil" condition might also be used in commercial flight where, on landing, thrust is spoiled to slow forward speed, and then on touch-down, the vanes are pivoted to effect a full reverse. With the engine still at full power, thrust reveral is easily attained without any delay associated with spooling up the engine.

In all of these situations, the first and eighth actuators (the "main actuators") 624a and 624h have been linked together via a splitter gearbox 630, providing dual redundancy. The remaining actuators 624b, 624c, 624d, 624e, 624f and 624g are driven via flex cable from, and attached to, actuators 624a and 624h. Each actuator has position sensing and clutching capabilities such that actuators may be operated independently of each other. This permits precision optimization of aircraft trim. Opening and closing the vanes will be controlled by the electronic engine control system of the aircraft. In cases where hydro-mechanical actuation is available, the aircraft flight control system will be used to control the vanes.

Figure 8:
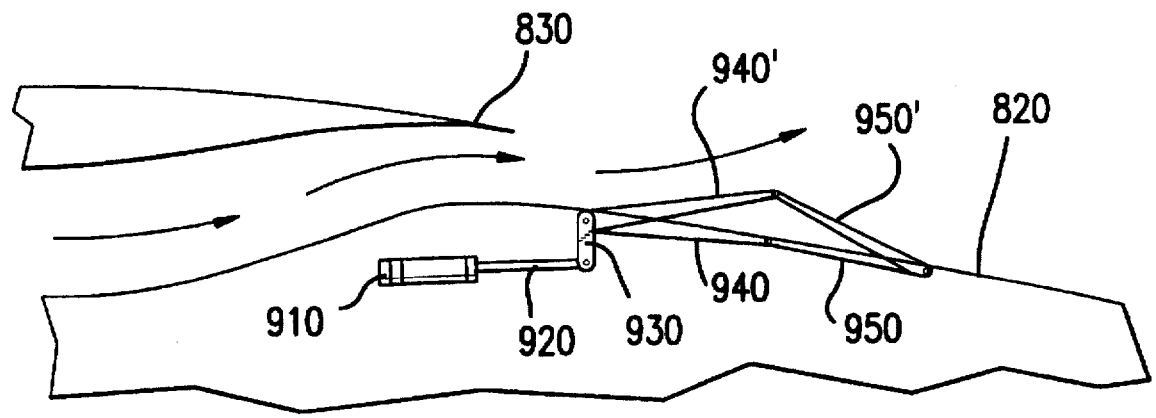
FIG. 8 is a cross-sectional schematic view of a second embodiment of a thrust vectoring assembly according to the present invention.

FIGS. 8 and 9 show a second embodiment of the thrust vectoring apparatus of the present invention. In the thrust vectoring apparatus shown in these Figures, the engine core cowl 820 supports the thrust vectoring apparatus 900, the latter being located downstream of the engine and the nacelle cowl 830. This embodiment enables no thrust reversing, but can achieve thrust diminishment or vectoring. The apparatus includes a piston 910 having a piston rod 920 coupled to a linkage 930 which engages a first, upstream end of a movable door 940 (the door in its displaced position is shown at 940'). A second door 950 (the displaced position is shown at 950') has a downstream end pivotably attached to the engine core cowl, and an upstream end pivotably attached to the downstream end of the first door 940. Movement of the piston rod 920 in a downstream direction causes the downstream end of the first door and upstream end of the second door to be displaced away from the engine core fairing into the engine exhaust gas flow. The effect of this action is to cause boundary layer separation of the exhaust gas flow from the engine core fairing at a location upstream of its separation point under normal operating conditions, thus altering the thrust component produced by the engine. As shown, there are a plurality of such hinged doors located circumferentially about the periphery of the core fairing. Each set of hinged doors is physically coupled and responsive to a piston and its piston rod. As thrust vectoring demands increase, various pairs of doors are actuated, via respective pistons and rods, to be introduced into the air flow. Air flow strikes, and passes over, the doors, and is directed away from the engine nacelle to create a net vectoring force. Unlike conventional pop-up panels, the hinged doors of the present invention do not create large recirculation (i.e., drag) regions behind the deflected doors.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. Apparatus for altering the direction of fluid flowing axially through a housing having a longitudinal axis, said housing having inner and outer walls and defining a conduit through which said fluid flows, said apparatus comprising:

at least one peripheral window of fixed longitudinal dimension in the walls of said housing communicating the interior of said conduit with the ambient, first means, disposed in said window, for altering the direction of said fluid flowing axially through said conduit, said first altering means comprising an array of pivotable vanes having a first position in which said vanes overlap and abut one another to create a fluid tight seal such that the array of vanes effectively form a closed door, and at least one other position in which said vanes are pivoted out of contact with one another such that the vanes allow passage of fluid from within said housing to the ambient, second means, disposed in said window, for altering the direction of said fluid flowing axially through said conduit, said second altering means comprising two panels connected together at a pivot point for operation between a first closed position in which said panels are essentially co-planar, and at least one other open position in which said panels are folded toward each other about said pivot point, said first and second altering means being spaced from one another with said first altering means being disposed closer to the ambient than said second altering means, and means, coupled to both of said first and second altering means, for synchronously driving each of said first and second altering means from their respective first positions in which both said altering means are inoperative and the flow of fluid is in said axial direction in the conduit through a range of other positions in which fluid flows from the conduit to the ambient through a spectrum of flow directions ranging from a direction essentially in the same direction as the flow of fluid through the housing to a direction essentially counter to the direction of flow of fluid through the housing.

2. The apparatus of claim 1, wherein said driving means is coupled to linkage means associated with said first and second altering means for effecting synchronous movement of said first and second altering means.

3. The apparatus of claim 2, wherein said movement is reciprocably directed along said longitudinal axis.

4. The apparatus of claim 2, wherein said driving means comprises piston means.

5. The apparatus of claim 2, wherein said driving means comprises rack-and-pinion means.

6. The apparatus of claim 1, wherein said housing contains an aircraft engine, said inner wall comprises an inner wall of an engine cowl, and said outer wall comprises an outer wall of an engine cowl, said apparatus further comprising a plurality of flow-altering sets including said actuating means and said first and second altering means, said flow-altering sets being disposed at peripherally spaced locations about the housing outer wall with each set being disposed in one of said peripheral windows, and further including means for selectively actuating predetermined flow-altering sets, so that thrust resulting from fluid exiting from said engine can be altered.

7. The apparatus of claim 6, wherein said windows are located at said peripherally spaced locations about said housing, and each of said flow-altering sets spans the longitudinal extent of each said window.

8. The apparatus of claim 6, and further including a plurality of said engine-containing housings disposed about an aircraft body, each of said engine-containing housings including said flow-altering sets, and further including means for actuating predetermined flow-altering sets such that the direction of thrust resulting from fluid exiting said engine can be altered.

9. The apparatus of claim 8, wherein said plurality of engine containing housings are disposed symmetrically about the aircraft body.

* * * * *